United States Patent
Wang

(10) Patent No.: US 9,622,116 B2
(45) Date of Patent: Apr. 11, 2017

(54) HANDLING UE-RELATED EVENT INFORMATION

(75) Inventor: Jun Wang, Jiangsu (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 616 days.

(21) Appl. No.: 13/977,533

(22) PCT Filed: Dec. 30, 2010

(86) PCT No.: PCT/CN2010/002218
§ 371 (c)(1),
(2), (4) Date: Jun. 28, 2013

(87) PCT Pub. No.: WO2012/088639
PCT Pub. Date: Jul. 5, 2012

(65) Prior Publication Data
US 2013/0281095 A1    Oct. 24, 2013

(51) Int. Cl.
*H04W 36/00* (2009.01)
*H04W 24/08* (2009.01)

(52) U.S. Cl.
CPC ....... *H04W 36/0005* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2007/0281712 A1* | 12/2007 | Povey | ........... | H04W 64/00 455/456.1 |
| 2009/0210516 A1* | 8/2009 | Roskowski | ........... | G06Q 10/06 709/219 |
| 2009/0307337 A1* | 12/2009 | Marshall | ........... | H04L 67/303 709/220 |

FOREIGN PATENT DOCUMENTS

| | | |
|---|---|---|
| CN | 101401401 A | 4/2009 |
| CN | 101416558 A | 4/2009 |
| CN | 101488149 A | 7/2009 |
| WO | 2005107309 A1 | 11/2005 |
| WO | 2008070689 A2 | 6/2008 |
| WO | WO-2010025026 A1 | 3/2010 |

OTHER PUBLICATIONS

Communication pursuant to Article 94(3) EPC for EP Application No. 10861305.0, mailed Dec. 10, 2015, 5 pages.
International Search Report, Application No. PCT/CN2010/002218, dated Oct. 20, 2011, 2 pages.
Extended European Search Report, EP Application No. 10861305.0, dated Feb. 16, 2015, 6 pages.
(Continued)

*Primary Examiner* — Shantell L Heiber
(74) *Attorney, Agent, or Firm* — NDWE LLP

(57) ABSTRACT

A method of managing event information relating to User Equipments (UEs) in a device is disclosed. The method includes creating a group of segments for each of the UEs upon the event information of the UEs, wherein each group includes at least one segment and each segment of one group includes the event information relating to the same UE; and storing the segments in order of time when the event information is recorded to obtain an event information sequence. A method for searching for the requested event information from the event information sequence is also provided.

9 Claims, 8 Drawing Sheets

(56) References Cited

OTHER PUBLICATIONS

R. S. Valiveti et al., "Self-Organizing Doubly-Linked Lists," School of Computer Science, Carleton University, Ottawa, Canada, Journal of Algorithms 14, 1993, pp. 88-114, downloaded from http://people.scs.carleton.ca/~oommen/papers/ValivetiOommenDLL93.pdf.
International Preliminary Report on Patentability, Application No. PCT/CN2010/002218, Jul. 2, 2013, 7 pages.
1st Office Action, CN Application No. 201080070992.5, Feb. 22, 2016, 19 pages.
2nd Office Action, CN Application No. 201080070992.5, dated Dec. 26, 2016, 11 pages.

* cited by examiner

UE1: segment 1 and 4
UE2: segments 2 and 5
UE3: segments 3 and 6

HANDLING UE-RELATED EVENT INFORMATION

CROSS-REFERENCE TO RELATED APPLICATIONS

This application is a National stage of International Application No. PCT/CN2010/002218, filed Dec. 30, 2010, which is hereby incorporated by reference.

TECHNICAL FIELD

The present invention relates to handling of the event information relating to User Equipments.

BACKGROUND

In TD-SCDMA Inter-Access Technology Handover (IratHO), such as from UTRAN (Universal Radio Access Network) to GSM (Global. System for Mobile communication) handover, a specific User Equipment (UE) often fails to handover from a certain UTRAN cell to a given GSM cell. In this case, the handover is frequently reattempted, causing that more UTRAN resources are wasted.

In order to avoid the waste for the resource, some protection mechanism is proposed to impose a forced inhibition of IratHO between the given UTRAN cell and GSM cell on the specific UE for a period of time such as 60 seconds when its IratHO failure number reaches a certain limit, such as 4 times. After the protection interval elapses, the IratHO is allowed again.

However, each UE context of handover can only remember its current state based on the proposed implementation, it is impossible to enable the protection on the previous cell and target cell. Further, it is hard to manage and maintenance the event history information in UE context directly not only because the history data is dynamic but the relationship between source and target cell is many-to-many and non-linear.

Therefore, there is a need for a method for efficiently managing such lots of history data, and thereby to facilitate to avoid the resource consumption.

In fact, the other application scenario also involves how to manage the UE-related history information besides the handover scenario. A solution on how to manage the UE-related history information is desired.

SUMMARY OF THE INVENTION

Aspects of the invention include a method of managing event information for various events of User Equipments (UEs). The method may includes creating a group of segments for each of the UEs upon the event information of the UEs, wherein each group includes at least one segment and each segment of one group includes the event information relating to the same UE; and storing the segments in order of time when the event information is recorded to obtain an event information sequence.

According to the method, all event information is constructed as the event information sequence which is formed by a lot of segments in time of order and in which all segments related to one UE belongs to a same group, therefore it is facilitate to manage the event information for various UE based on such a structure even though there are a lot of event information.

The method of the present invention may further include one or more elements, each element including a next pointer pointing to a next element in the event information sequence. Optionally, the method further include a state showing whether the element is released, a next segment pointer pointing to a next segment in the same group, one or more previous pointers pointing to a previous element in the event information sequence, and the identity of the segment.

The element in the event information sequence can be linked each other by the next pointer, next segment pointer etc, thereby the next element can be easily found via these pointers.

Another aspects of the present invention includes a method for handling a request for obtaining event information relating to User Equipments (UEs) from an event information sequence, which is obtained by creating a group of segments for each of the UEs upon the event information of the UEs, each group including at least one segment, each segment in one group including one or more elements, and each element including the event information relating to the same UE, and storing the segments in order of time when the event information is recorded, the method including searching, upon the request which including the identity of a UE and at least one matching parameter, the requested event information from said event information sequence by comparing the at least one matching parameter with a stored event information of the segments in the group which is created for the UE after said group is obtained based on the identity of the UE included in the request.

It is preferred that the event information sequence can be obtained by said method for managing event information relating to UEs in the device.

From such event information sequence, the group for a certain UE can be determined almost immediately upon receiving the requested for obtaining the UE-related information, and the next element can be found via the pointers provided with the current element so as to enable the next element can be determined whether it is the requested information after the current element.

There also provide equipment which is used for handling event information of various User Equipments (UEs). The equipment may comprise a storage device, an input module, and an output module. The storage device can be used to storage an event information sequence obtained by creating a group of segments for each of the UEs upon the event information of the UEs, each group including at least one segment, each segment in one group including one or more elements, and each element in one group including the event information for the same UE, and arranging the elements in order of time when the event information is recorded. The input module may be used to receive a request for searching an event information from the storage device. The output module may be used to send a result of said searching.

The event information stored in the equipment according to the present disclosure contributes to the managing of the event history relating to each UE as the sequence is constructed on a plurality of groups of segments for various UEs and stored in order of time of the element of each segments when the event information of the element is recorded.

Optionally, the equipment can further include an application processing module used for searching, upon the request which including the identity of a UE and at least one matching parameter, a requested event information from the event information sequence stored in the storage device by comparing the at least one matching parameter with a stored event information of the segments in the group which is created for the UE after said group is obtained based on the identity of the UE included in the request. Rapidly finding the requested event information from the event information sequence stored in the storage device in order of time can be therefore achieved.

BRIEF DESCRIPTION OF THE DRAWINGS

The invention will be better understood with the aid of the description of an embodiment given by way of example and illustrated by the figures, in which.

DETAILED DESCRIPTION

Before the present invention is described, it is to be understood that this invention is not limited to any particular embodiment described, as such may, of course, vary. It is also to be understood that the terms used herein are for the purpose of describing particular embodiments only, and are not intended to be limiting. The scope of the present invention is only limited by the appended claims.

Unless defined in the context of the present specification, otherwise, all technical and scientific terms used herein have the same meaning as commonly understood by one of ordinary skill in the art to which this invention belongs.

It must be noted that as used herein and in the appended claims, the singular forms "a", "an", and "the" include plural referents unless the context clearly dictates otherwise.

Moreover, by way of a non-limiting example, the methods and equipment of the present invention are illustrated by being used in the handover scenario of a UE for example from a UTRAN cell to a GSM cell. However, it should be understood that the present invention can be used to manage any type of UE-related data or information involving in any other specific application scenario besides the handover, for example the application scenario of RAE being established, changed, and cancelled, etc.

Although the method according to the present invention is described hereinafter in conjunction with a specific device, control node, or equipment, and the like, it is not intended to limit said method only can be employed in that device, control node, and equipment.

Figure 1:
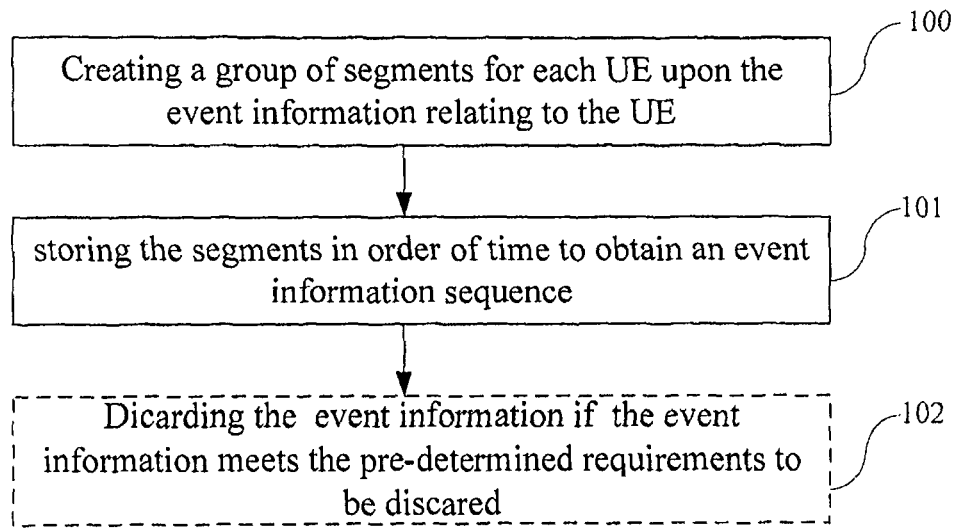
FIG. 1 is a flow chart of the method for managing the event information relating to User Equipments according to an embodiment of the present invention.

FIG. 1 is a flow chart of the method for managing the event information relating to User Equipments according to an embodiment of the present invention. The method, as shown in FIG. 1, can be used in a mobile communication system, the WLAN (Wireless LAN), and the like. In the case that the method is used in the mobile communication system, it can be implemented in a control node, such as, by way of a non-limiting example, the Radio Network Control (RNC) node, the Home Location Register (HLR), and Base Station (BS). The event information, which is the information or data of various events relating to the User Equipments, can be stored in a storage device, which can be included in the control node or separated from the control node.

After being recorded for example by the control node, according to at least one of the embodiments of the present invention, a group of segments are created (step 100) based on the recorded event information for each of the UEs; thereby a plurality of groups of segments can be created for a plurality of UEs. Each group includes at least one segment and each segment of one group includes the event information relating to the same UE.

The segments are stored in order of time when the event information is recorded (step 101) such that an event information sequence is constructed on basis of all segments groups. Each segment includes one or more elements where each element at least includes a next pointer pointing to a next element in the event information sequence. In this case, each element includes the event information such as for an event. Preferably, a state showing whether the element is released is included in each element. Each segment further includes a next segment pointer, which points to the next segment in the same group, one or more previous pointers, which points to the previous element in the event information sequence, and an identity showing which one of the User Equipments is related to the segment. One segment in the same group is accordingly linked to the next segment by its next segment pointer, and one element is linked to the next element in the event information sequence via its next pointer.

By way of a non-limiting example, each segment at least includes a segment head, namely, at least one element of each segment is the segment head, and a series of segment members, that is, the other elements in one segment except the segment head are segment members. The next segment pointer, the previous pointer, and the identity can be provided within the segment head. The element which serves as the element member thus only includes a next pointer and a state compared to the element which serves as the segment head including the next pointer, the state, the next segment pointer, the previous pointer, and the identity. It should be noted that the series of segment members can be zero, which means a segment can only include a segment head and not include any segment member.

Further, either of the segment head and the segment member includes the event information relating to UEs with respect to the specific application scenario such as handover. As an example, in the case of the application scenario is the handover scenario, the event information also can be termed triplet which includes the source cell identity, the target cell identity, and the UE identity (UEId).

For the sake of clarity, each element will be described as the structure that comprises an information part and a control part, where the information part refers to the event information and the control part refers to the maintenance data. The information part for example comprises the next pointer, the state, the next segment pointer, the previous pointer, and the identity if the element is a segment head and comprises the next pointer and the state if the element is a segment member.

Figure 2:
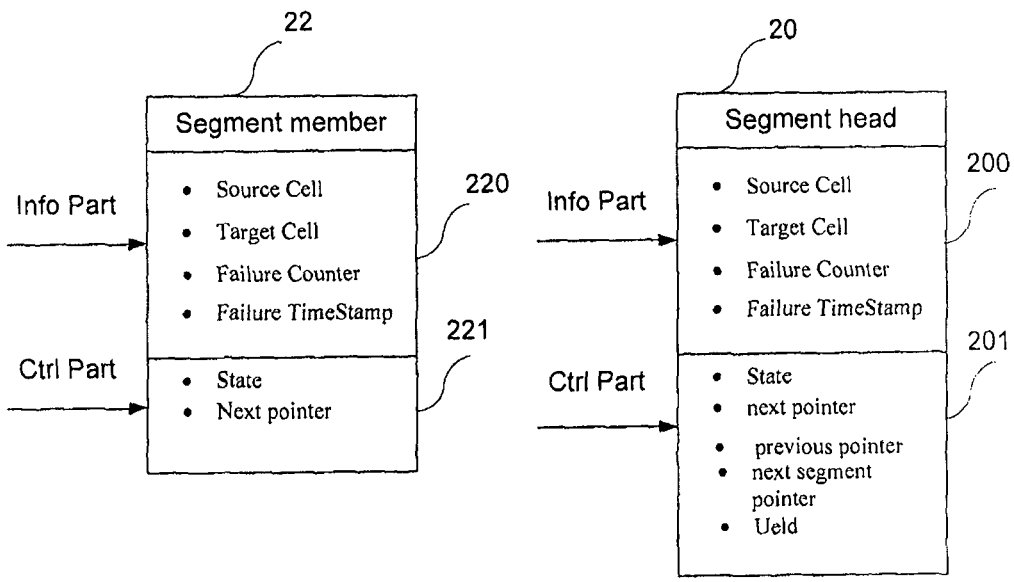
FIG. 2 illustrates structures of the segment head and the segment member according to an exemplary embodiment of the present invention.

Referring to FIG. 2, illustrating the structures of the segment head and the segment member according to an exemplary embodiment of the present invention, the segment head 20 comprises a head information part 200, which is used to record the application data of the specific application scenario, and a head control part 201, which is used to record the metadata for the event information sequence maintenance.

In the case of handover scenario, the application data of the head information part 200 includes the information of the source cell, target cell, failure counter, and failure timestamp, in which the information of source cell and the target cell can be the identities of the source cell and the target cell, respectively, the failure counter demonstrates the times of handover failures, and the failure timestamp records the actual time for each handover failure. The maintenance data of the head control part 201 includes the identity of the segment, an next pointer, an previous pointer, an next segment pointer, and the state of this segment head, where the identity of the segment indicates which one of the multiple User Equipments is related to this segment, the next pointer points to a next element in the event information sequence in which the next element is a segment member when a segment member is next to the segment head 20 or the next element is a segment head when a segment head is next to the segment head 20 in the event information sequence, the previous pointer points to a previous element in the event information sequence in which the previous element is a segment member when a segment member is previous to the segment head 20 or the element is a segment head when a segment head is previous to the segment in the event information sequence, the next segment pointer points to a next segment within the same group, and the state can be used to show whether segment head 20 is the head of the event information sequence or the tail, and also can be used to show whether the segment head is released. By a non-limiting example, the state can be represented as idle when the segment head is released. The term "released" herein refers to the storage used to store the segment head 20 can be re-used to write new data. It should be noted that the next segment pointer of the segment head 20 can point to segment head 20 itself when it is the last element in the group including it. It can be appreciated that the identity of the User Equipment (UeID) can be employed to identify the User Equipment-related segment. Hereinafter, as an example, the identity of one User Equipment is used as the identity of the segment of that Equipment.

Still referring to FIG. 2, the segment member 22 comprises a member information part 220 recording the application data of the specific application scenario and a member control part 221 recording the metadata for the event information sequence maintenance. In case of handover, the application data of the member information part 220 includes information of the source cell, target cell, failure counter, and failure timestamp, in which the information of source cell and the target cell can be the identities of the source cell and the target cell, respectively, the failure counter demonstrates the total times of handover failures, and the failure timestamp records the actual time when each handover failures. The maintenance data of the member control part 221 includes the information of the state and the next pointer, in which the next pointer points to a head of the next segment in the event information sequence, or points to the next member in the same segment, and the state shows whether this segment member is the head of the event information sequence or the tail, or shows whether the member is released. As an example of the present embodiment, the state can be represented as idle when the segment member is released. Furthermore, it should be noted that when the segment member is the last member of the event information sequence, the next pointer can be null.

The plurality of groups of the segments for the User Equipments are stored in a storage device of the control node in order of the time of the segment heads or segment members, where said time is the time when the event information is recorded for example by the control node. It is understood that the event information can be embodied as the segment heads and/or the segment members upon being recorded, and also can be embodied while being recorded.

It will be appreciated that a storage unit in the storage device used to store the element of the event information sequence can be re-used to write other data when the state of the element is idle.

Figure 3:
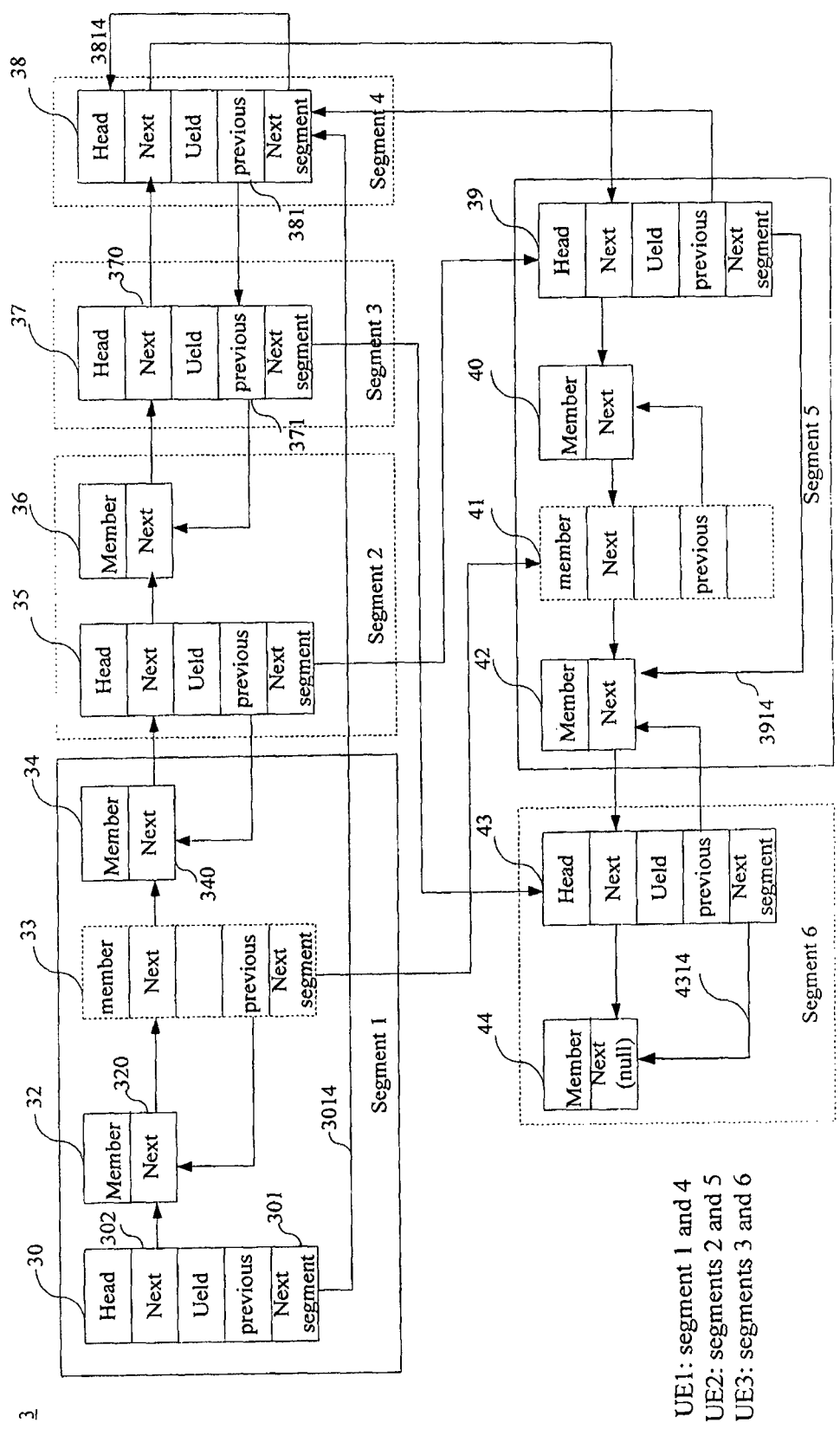
FIG. 3 illustrates the relative relationship among the segments, the groups, and the event information sequence.

FIG. 3 illustrates the relative relationship of the segments, the groups, and the event information sequence. As shown in FIG. 3, there are six segments and three User Equipments. The segments from 1 to 6 establish the event information sequence 3. As shown in FIG. 3, the contents or data of the segment 1 and segment 4 are related to the same User Equipment UE1, namely, the group consisting of the segments 1 and 4 is created for UE1. Also, the group including the segments 2 and 5 is created for UE2 and the group including the segments 3 and 6 for UE3.

As shown in FIG. 3, the next segment pointer 301 of the segment head 30 in the segment 1 points to the segment 4 as shown by the arrow line 3014 where the segment 4 is the element next to segment 1 in the segments group for UE1, and the next pointer 302 points to the segment member 32 of the segment 1 which is adjacent to the segment head 30. The segment 1 further includes segment members 33 and 34. As above discussed with reference to FIG. 2, it should be understood that the structure of the segment head, when it is idle, can be used for a segment member since there are more fields in the segment head than the segment member. Therefore, the physical storage room used to store the segment head can store the segment member. In the case that the structure of a segment head is temporally used as a segment member, the next pointer in the idle segment head is used as the next pointer of the segment member and the next segment pointer is used as a substitute pointer pointing to the next member in a substitute set, where the substitute set includes those members temporally residing in the segment head. Further, the previous pointer of the idle segment head is still used as the previous pointer pointing to the previous element in the event information sequence 3. In the example shown in FIG. 3, there are two of the segment heads in the event information sequence 3 temporally used for a segment members 33 and 41, respectively. The next segment pointer of the member 33, used as the substitute pointer, points to the next member 41 in the substitute set. The next segment pointer of the last member in the substitute can be null.

In the case that the segment only includes a segment head without a segment member and the segment is not the last segment of the group including said segment, the next pointer of said segment points to the segment head of the next segment in the event information sequence. For example, the next pointer 370 of the segment 3 points to the segment head of segment 4. Further, the previous pointer of one segment head either points to the segment member of the previous segment in the event information sequence, for example, the previous pointer 371 of segment 3 points to the segment member 36 of segment 2, or points to the segment head of the previous segment in the case that the number of the segment members in the previous segment is zero (i.e., the previous segment has no segment member), for example, the previous pointer 381 of the segment head 38 of segment 4 points to the segment head 37 of segment 3. The next pointer of the segment member, in the case that the segment member is the last element of a segment, points to the head of the next segment in the event information sequence; otherwise points to next element of the event information sequence. As an example, the next pointer 340 of the segment member 34 of the segment 1 points to the segment head 35 of the segment 2, and the next pointer 320 of the segment member 32 of the segment 1 points to the segment member 33 of segment 1.

The next segment pointer of a segment mostly points to the segment head of the next segment in the same group. For example, the next segment pointer of the segment head 35 of the segment 2 points to the segment head 39 of the segment 5, and thereby links the segment 5 to the segment 2. However, if a segment head is the last element of a group, then its next segment pointer points to itself, as an example, the next segment pointer of segment 4 points to itself as shown by the arrow line 3814, if a segment head is the last segment head of a group following by segment member(s), the next segment pointer of said segment head points to the last member after the segment head in the group, for example, the next segment pointer of segment 5 points to the segment member 42 as shown by the arrow line 3914, and the next segment pointer of segment 6 points to the segment member 44 of segment 6 as shown by the arrow line 4314. Further, as the last member of the event information sequence, the next pointer of the member 44 is null.

Each segment is linked to the next segment in the event information sequence by the next pointer of its segment head or its last segment member pointing to the segment head of the next segment, and is linked to the previous segment in the event information sequence by the previous pointer of its segment head pointing to the segment head or the last segment member of the previous segment.

The event information sequence 3 is constructed from the segments 1, 2, 3, 4, 5 and 6, which are linked each other by the next pointers, previous pointers, the next segment pointers, and the like, as shown in FIG. 3. All elements in same group are linked together via these pointers as above mentioned such that all the later elements in the group can be easily found successively after obtaining the earlier element in the group.

It should be noted that the event information sequence 3 shown in FIG. 3 is only used as an example, not to limit the present invention. The number of the groups, segments, segment heads, and segment members in practice can be any other numbers different from that shown in FIG. 3.

By way of non-limiting example, the event information sequence 3 constructed as above discussed is stored into the storage device of the control node by the manner that the segment heads are successively stored into the consecutive storage units of one area of the device and the segment members are stored into the storage units of another area of the device. It is preferred that there is an unallocated area in the storage device between the area storing the segment heads and another area storing the segment members. The event information sequence constructed as above discussed can also be stored in other way, for example the segment head and the segment member are stored in turn.

As discussed above, the state in the control part of the segment head and that of segment member are used to indicate whether the storage units storing the segment head and the segment member can be re-used, i.e., be overwritten data, respectively.

Figure 4:
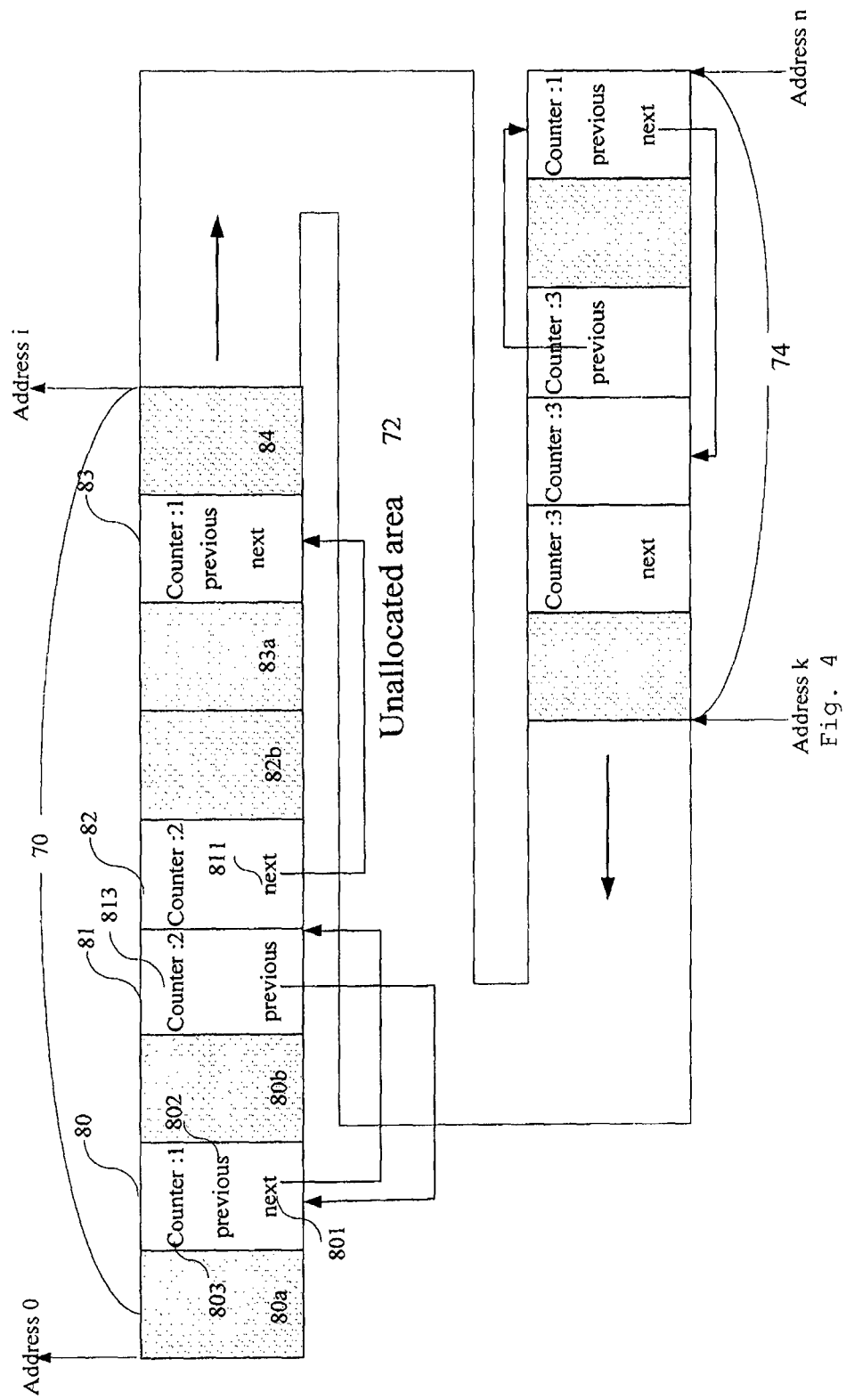
FIG. 4 illustrates the physically arrangement of the storage device according to the present invention.

FIG. 4 illustrates the arrangement of the storage device according to the present invention. The storage device for storing the event information sequence is physically arranged with three areas, including the segment head allocated area 70 used to store the segment heads, the unallocated area 72 which keeps null, and the segment member allocated area 74 used to store the segment members. The storage units of the storage device can be allocated to the segment heads from the beginning, such as the unit with address 0 shown in FIG. 4, to an intra-storage unit, such as the unit with address i. While the storage units of the storage device can be allocated to the segment members from the end of the storage device, such as the unit with address n shown in FIG. 4, to another intra-storage unit, such as the unit with address k. The storage units with address from i to k, which are located between the segment head allocated area 70 and the segment member allocated area 74, are unallocated area 72.

As discussed above, when a segment element is released, the storage unit(s) storing the released segment element would be idle as indicated by the state of the control part 221 or 201, such that the other event information can be written to the storage unit(s). In order to use the storage units in a more efficient manner, a segment head free list and a segment member free list can be created for maintaining the storage units in idle. The segment head free list includes a plurality of maintaining nodes, in which each maintaining node comprises a counter and at least one pointer. The counter shows how many storage units in a row are idle and the pointer in one maintaining node points to the adjacent idle storage unit(s).

Now explains how to efficiently maintain the segment head allocated area by means of the segment head free list with reference to FIG. 4. As shown, when the storage unit 80 is idle, a maintaining node for unit 80 is added to the free list, while a counter 803 and a next pointer 801 and a previous pointer 802 are created within this maintaining node. In the case that the units 80*a* and 80*b* adjacent to storage unit 80 are used, the counter 803 of this node is 1, the next node pointer 801 points to the next storage unit in idle for example storage unit 81, and the previous node pointer 802 points to the previous storage unit in idle if any. The counter 803 will be added 1 when any of the storage units 80*a* and 80*b* is in state of idle. The counter in one maintaining node for a storage unit is added when the storage unit(s) adjacent to the storage unit is idle. If the storage unit is adjacent to several consecutive storage units, then the counter in the maintaining node for this storage unit is added by amount corresponding to the number of the consecutive storage units. As an example, when the storage unit 81 is idle, the counter 813 of the maintaining node in the segment head free list for the storage unit 81 should be 1, the previous node pointer 812 points to the storage unit 80, and the next node pointer 811 points to the next storage unit in idle for example the storage unit 83. However, when the storage unit 82 is idle, then the counter 813 is changed to 2 from 1, showing that there are two consecutive idle storage units. In this case, the segment heads stored in the storage units 82*b* and 83*a* can be moved to the storage units 81 and 82, respectively, then the storage units 82*b* and 83*a* are changed to idle. Thus the storage units

82b, 83a and 83, which are idle in a row, forms an idle area in the segment head allocated area 70. In this situation, once the storage unit 84 is idle, said idle area is extended to 4 storage units in idle from 3. If the storage unit 84 is adjacent to the unallocated area, and then the idle area which is extended from 3 storage units to 4 as above mentioned is merged with the unallocated area. Therefore efficiently managing of the idle storage unit(s) to facilitate the storage units can be re-used when they are idle is achieved.

The term "merge" and its conjugation herein does not refer to the storage units is physically merged each other, but refer to the merged idle storage units can be considered to form a area which can be re-used to write data.

The segment member allocated area 74 is efficiently maintained by means of the segment member free list in the manner as above discussed with respect to the segment head allocated area.

Alternatively, the storage units started with address n and ended with address k can be allocated to the segment head, and the storage units from address 0 to i can be allocated to the segment member.

For any of the allocated area, when an idle storage unit or a plurality of idle storage units occurs at the border of the allocated area, such as the storage unit with address i and the storage unit with address k, the idle storage unit and the plurality of idle storage units can be merged into the unallocated area, thereby make the unallocated area as large as possible.

The event information for various events for User Equipments is recorded as a plurality of groups of the segments as discussed above, and these segments can be stored in the storage device in the manner as shown in FIG. 4.

Now referring to FIG. 1, any event information of the element meeting a pre-determined requirement to be discarded is discarded (step 102). The pre-determined requirement to be discarded can be for example the event information expiring, the storage device being full, or a discarding operation being trigged. It should be noted that step of discarding is an optional step. As an example, it is not necessary to perform the discarding operation if the storage device has idle storage units. It should be noted that the event information being discarded means the storage unit (s) used to storing said event information can be used to write the other event information and the state of the element can therefore be represented as idle when the discarding operation is performed to that element.

Figure 5A:
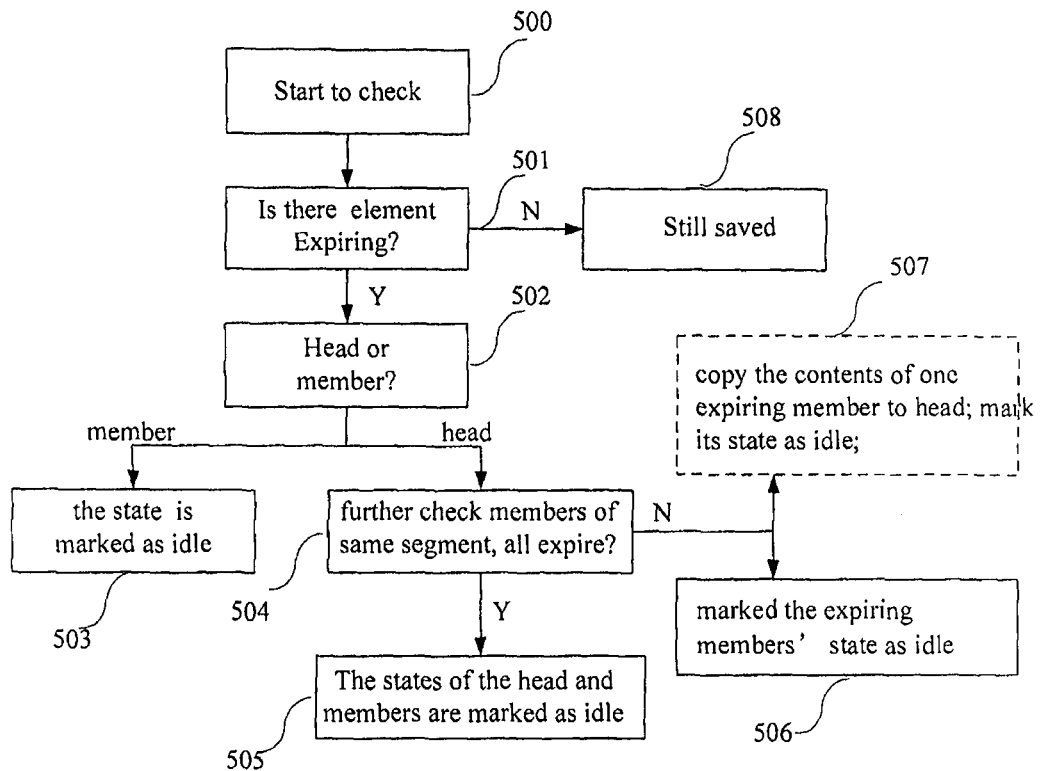
FIG. 5A is a flow chart of the method on how to handle those elements which meet the requirements to be discarded in the storage device, according to one example of the present invention.

FIG. 5A is a flow chart of the method on how to handle those elements which meet the requirement to be discarded in the storage device, according to one example of the present invention. This method can be implemented for example by a control module for managing the storage device in the control node. The method can be performed in the condition for example that the storage device is full such that some storage room need to be released or the method can be performed in a period of time to obtain some storage unit. The requirement to be discarded herein can be any requirement pre-determined to discard the event information. By way of a non-limiting example, the requirement can be the event information expiring.

The method performed by the control node, to be specific, the control module for managing the storage device in the control node, starts with step 500. The control module further checks the event information sequence to determine (step 501) whether there is any element meeting the pre-determined requirement. If there is an element meeting the requirement, then the control node further determine (step 502) whether the element meeting the requirement to be discarded is the segment member or the segment head; otherwise, the element is still saved (step 508). If the element is a segment member, then the state of the control part of the segment member is marked (step 503) as idle, i.e., the storage unit used to store this member can be re-used to store the other information. If the element is a segment head of one segment, then further check (step 504) each of the segment members in the same segment, if any, to determine whether these segment members meet the requirement to be discarded. In the case that each of the members in this segment meets the requirement to be discarded, then the state of control part of the segment head and members are marked (step 505) as idle, and the storage units used to store the segment head and members of this segment; can be re-used. However, if a part of the members meet the requirement to be discarded, then only the state of the control part of that part of members are marked (step 506) as idle, namely, in this case, the segment head and those members not satisfying the requirement are still saved. In the condition that there are only one segment member is linked to the segment head in the same segment, if the segment head meets the requirement and the segment member does not meet, it is preferred that the contents of the segment member will be copied (step 507) to the segment head, and the state of the control part of this member is marked as idle. It is preferred that the contents of at least one segment member can be copied to the segment head when there is part of the segment members expire, where the at least one segment member is the earliest one of those segment members not expiring. According to the present embodiment, it is preferred that the segment head is not discarded as long as there is one member linked to it not meeting the requirement.

It is understood that those expiring elements, which has been checked and marked as idle, can be unlinked from the event information sequence. The terms "unlinked from the event information sequence" herein refer to the element is removed from the event information sequence. As an example, when some element is unlinked from the event information sequence, the previous pointer of the element next to said some element, which is found by the next pointer of said some element, is changed to point to the element previous to said some element, and the next pointer of the element previous to said some element is changed to point to the element next to said some element.

Figure 5B:
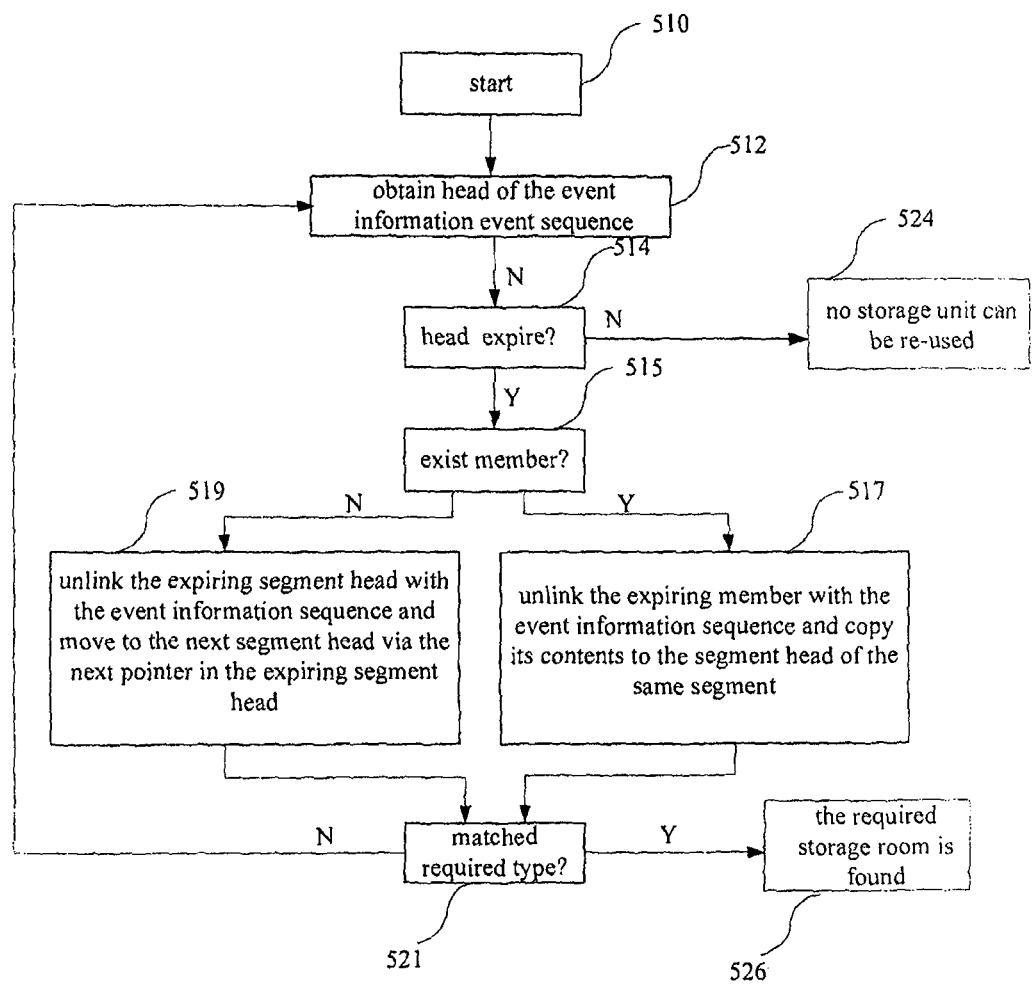
FIG. 5B is a flow chart of the method for obtaining the required storage room, according to another example of the present invention

FIG. 5B is a flow chart of the method for obtaining the required storage room, according to another example of the present invention. According to this example, the method is performed when there is no enough storage room in the storage device.

The method as illustrated starts with step 510. Then at step 512, the control node, to be specific, the control module for managing the storage device in the control node, obtains the head of the event information sequence, i.e., the segment head of the first segment in the event information sequence. Then the method determines whether the segment head expire (step 514) by comparing the time when the contents of the element are recorded for example by control node with a predetermined time parameter. As an example, the segments whose recorded time are earlier than the current time of the control node 120 seconds are those that expire.

If the obtained segment head does not expire, then there is no storage unit can be re-used since the elements in the event information sequence is constructed in order of time as above described (step 524). If the obtained segment head expires, the control node further determines (step 515) whether there is segment member(s) in the same segment. If there is no segment member, then the segment head is unlinked from the event information sequence, and then the next segment head which is found via the next pointer in said segment head is changed to the first head of the event information sequence, as shown at step 519. Further, the state of the segment head unlinked from the event information sequence is marked as idle to show that the storage unit storing said head can be re-used.

If there is segment member, then the contents of the segment member not expiring will be copied to the segment head and the segment member is unlinked from the event information sequence as shown at step 517. In this case, the unlinked segment member is marked as idle, and thus the storage unit storing it can be re-used. In the case that there are more than one segment members in the same segment, the contents of the first checked segment member not expiring can be copied to the segment head, and all segment members expiring are unlinked from the event information sequence and are preferably marked as idle, as shown at step 517.

Then at step 521, the control node checks whether the storage unit marked as idle is the required type, where the required type is the head allocated area if the required storage room is used to store the segment head and the required type is the member allocated area if the required storage room is used to store the segment member. If so, the required storage room is found (step 526). Otherwise, the method proceeds to step 512 to obtain the new segment head so as to check the event information sequence stored in the storage device again.

Those storage units marked as idle during the execution of the method shown in FIG. 5A or FIG. 5B can be managed as shown in FIG. 4.

As above described, all elements in the event information sequence are arranged in order of time and linked each other, thereby manage the storage units at a high rate.

Figure 6:
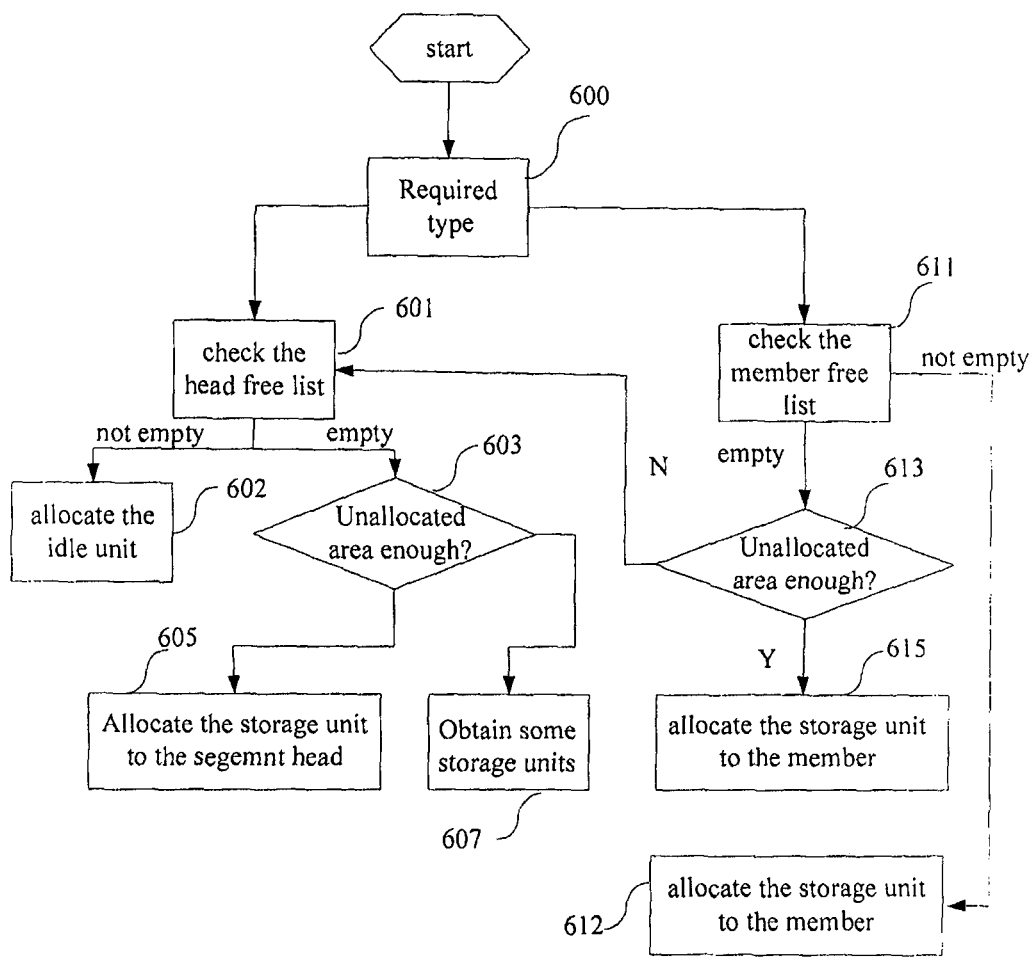
FIG. 6 shows a flow chart of the operation of allocating the storing units in the storage device to the event information sequence.

FIG. 6 shows a flow chart of the operation of allocating the storing units in the storage device to the event information sequence. The operation of the allocation can be performed by for example the control module above mentioned. After starting the procedure of the allocation operation, the control module determines (step 600) which type of the storage unit(s) is required, that is, the control module determines the required storage units) is used to store the segment head or to store the segment member. If the control module determines that the required storage unit is employed to store the segment head, then the control module checks (step 601) the segment head free list to determine whether there is available storage unit in the head allocated area of the storage device. If the head free list is empty, i.e., there is no available storage unit listed in the head free list, then the control module further checks (step 603) whether the unallocated area in the storage device is enough to store the segment head. If enough, then allocates (step 605) the storage unit(s) to the segment head; otherwise, the control module can obtain (step 607) the storage unit(s) for the segment head by finding those elements in idle, for example, by means of performing the method as shown in FIG. 5A. If the free list shows that there are available storage units, i.e., there are available storage unit(s) listed in the list, the control module allocates (step 602) the required storage unit to the segment head. If the control module determines (step 600) that the required storage unit is used to the segment member, then it further checks (step 611) the member free list. If the member free list shows that there are available storage units, i.e., the list is not empty, the control module allocate (step 612) the required storage unit to the segment member. If the member free list shows there is no available storage unit, then the control node checks (step 613) whether the unallocated area in the storage device is enough to store the segment member. If enough, then the control module allocates (step 615) the required storage unit to the segment member. Otherwise proceeds to step 601 to check the head free list so as to determine whether the segment head allocated area has the storage unit (s) to store the segment member. In the case that there is enough storage unit (s) in the head allocated area, the segment member is stored temporally in the segment head allocated area. As illustrated hereinbefore in combination with FIG. 2 and FIG. 3, it is noted that the fields of the segment member are less than the segment head, therefore the segment member can be stored in the storage unit of the segment head allocated area. In the case that the segment member is stored in the segment head allocated area, with reference to FIG. 3, a substitute list can be created for all segment members which are stored temporally in the segment head allocated area such that these segment temporally stored in the segment head can be easily maintained. The segment members listed in the substitute list further includes a next substitute segment pointer used to point to the next segment member in the substitute list, where the substitute segment pointer can employ the next segment pointer in the structure of the segment head. It should be noted that those segment members temporally stored in the head allocated area can be moved back to the member allocated area in the case that there are enough storage units in the member allocated area or there are enough storage units in the unallocated area.

From the event information sequence, which is obtained by creating a group of segments for each of the UEs upon the event information of the UEs and storing the segments in order of time when the event information is recorded in the manner as above discussed, it is also advantage for searching the event information relating to a certain UE.

When the control node, such as the RNC in the communication system, receives a request with the identity of a UE and at least one matching parameter for the event information relating to said UE, the control node can immediately obtain the group related to the UE from the event information sequence regardless of the event information of the other UEs.

Figure 9:
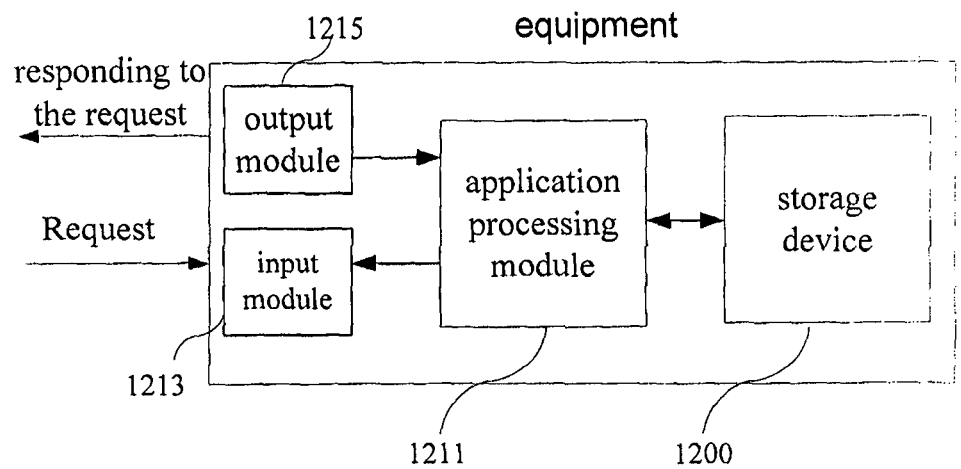
FIG. 9 illustrates equipment according to an embodiment of the present invention.
Figure 7:
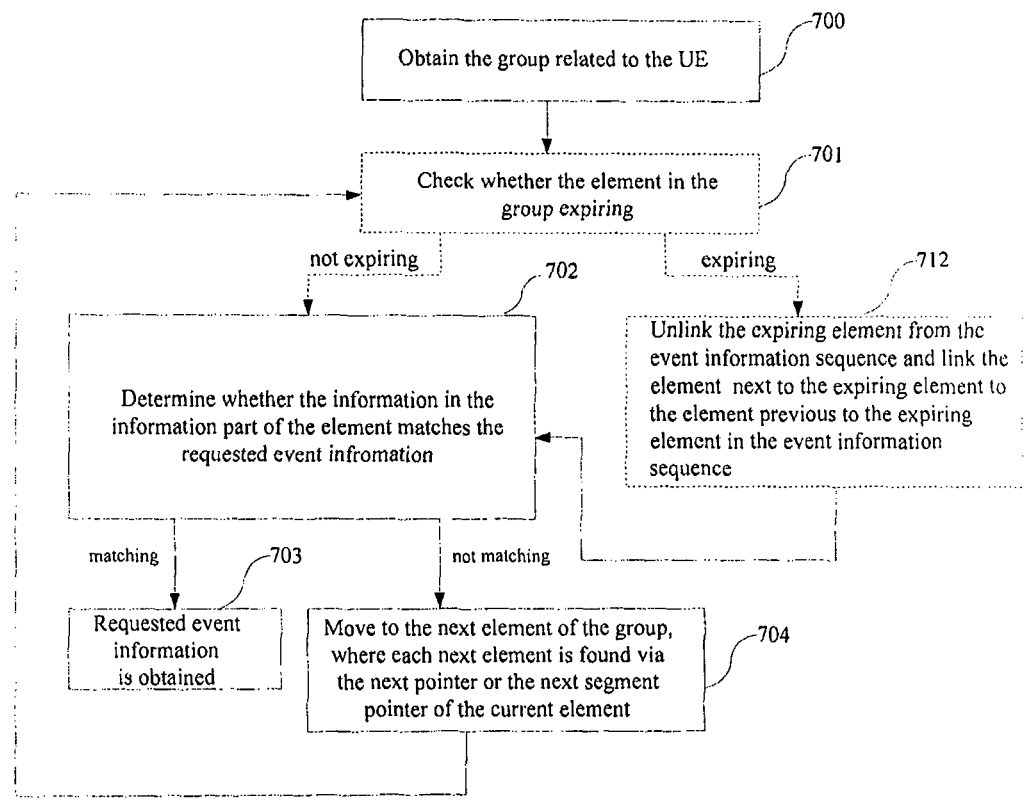
FIG. 7 illustrates a flow chart of searching requested event information from the event information sequence.

FIG. 7 illustrates a flow chart of searching requested event information from the event information sequence. As an example, the method can be performed by a device, such as a control node, for example a RNC etc. By non-limiting example, the method will be described in conjunction with equipment as shown in FIG. 9. However, it should be understood that the method for searching the requested event information herein can be implemented in the other device other than the equipment shown in FIG. 9.

The storage device 1200, as shown in FIG. 9, is used to store the event information sequence as above described with reference to FIGS. 2, 3 and 4. The application processing module 1211 is used to search for the requested event information from the event information sequence stored in the storage device 1200 for example by performing the method showing in FIG. 7. The equipment shown in FIG. 9 further includes an input module 1213 which is used to receive the data sent to the equipment, for example, the request of searching for an event information, and an output module 1215 which is used to transmit data from the equipment, for example, the result of the request for searching the event information. It can be understood that both the input module and the output module can be integrated into one. Furthermore, the application processing module 1211 and storage device 1200 can be implemented in separate device, rather than in the same equipment as shown in FIG. 9. It should be noted that the equipment shown in FIG. 9 can be a control node when the method is used in a communication system.

In brief, according to the method of searching the requested event information in accordance with the present invention, the related group is first found based upon the identity of the User Equipment within the request. Then, the element in the related group is in turn checked by comparing or matching the information of the information part in the elements with pre-determined matching parameters till the requested event information is obtained or all elements in the group is checked without finding the requested event information.

As shown, the application processing module 1211 of the equipment obtains through the input module 1213 the respective group which is created for the specific UE involved in the requested event information via such as the UEID (step 700). Then the application processing module 1211 checks (step 701) whether the element in the group expires by for example comparing the time when the information of the information part of the element is recorded with the request time, where the requested time can be a time parameter involved in the request or can be the time when the request is received by the equipment and the like. If the element expires, it will be unlinked from the event information sequence, and then the element previous to the expiring element links to the element next to the expiring element (step 712). As an alternate, the state of the unlinked element is marked as idle; therefore the storage unit storing the element can be re-used. If the element does not expire, then the application processing module 1211 further determines whether the information in the information part of the element is the requested event information by matching at least one matching parameter with the event information in the information part (step 702). If matched, then the requested event information is obtained (step 703) and the obtained event information can be sent out through the output module 1215. Otherwise, the application processing module 1211 moves to the next element of the group via the next pointer or the next segment pointer (step 704). It can be understood that the application processing module 1211 finds the next element via the next pointer of the current element when the next element is a segment member, and the application processing module 1211 finds the next element via the next segment pointer when it is a segment head. After moving to the next element, the application processing module 1211 proceeds to step 701. It should be noted that the steps of 701 and 712 are optional step, that is, after the step of 700, the application processing module 1211 can determine (step 702) whether the information in the information part of the element is the requested event information without checking whether the element expires.

In the case that the method according to the present invention is used in the handover scenario, the event information of each element, i.e., the information of the information part of each element includes the target cell information, the source cell information, the failure counter, and the failure timestamp. In this case, the control node, such as the equipment shown in FIG. 9, can be a RNC, BS and other equipment in the mobile communication system.

In the case of handover, as a specific implementation, the group related to the UE which is involved the requested event information can be found with a head pointer and a tail pointer both of which are pre-set in the UeContext of handover. It can be understood that for the other application scenario, in practice, the group related to the UE also can be found with a head pointer and a tail pointer in case that both of the head pointer and the tail pointer are pre-set in the UeContext of said application scenario.

Figure 8:
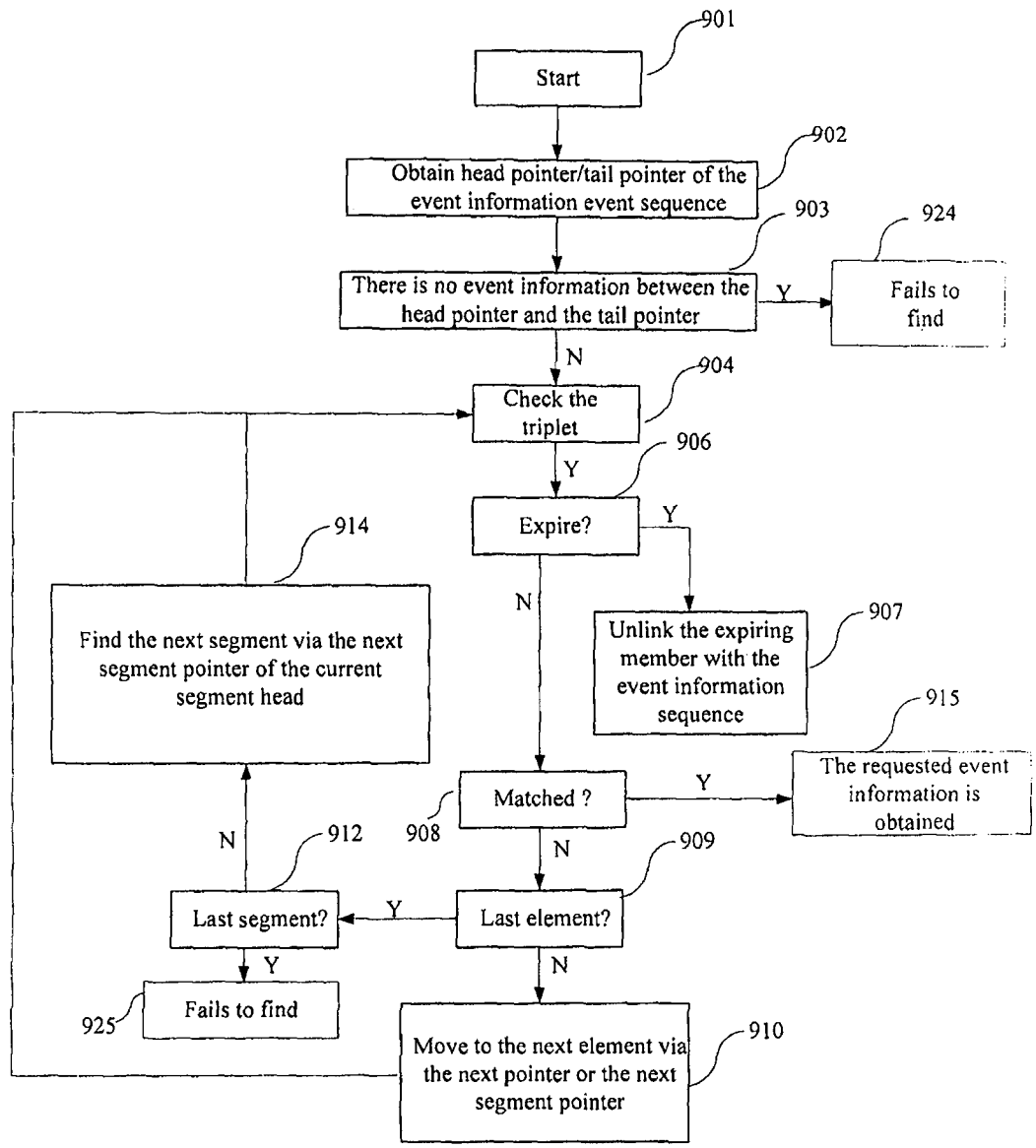
FIG. 8 illustrates the flow chart of the method for searching the requested event information sequence from the event information sequence used in handover scenario, according to an exemplary embodiment.

FIG. 8 illustrates the flow chart of the method for searching the requested event information sequence from the event information sequence used in handover scenario, according to an exemplary embodiment. Said method will now be explained with reference to FIG. 9 without intending to limit that method only can be performed in the equipment shown as FIG. 9.

The application processing module 1211 starts (step 901) the searching operation for example when the equipment receives a request for searching the event information from a User Equipment or a target cell via the input module 1213. The request should be of or point out which one of the User Equipments the event information requested is related to.

A head pointer and a tail pointer which are included in the handover UeContext are obtained (step 902), and thus the group related to the UE associated with the request is obtained. Then, the application processing module 1211 checks (step 903) whether there is event information between the head pointer and the tail pointer. If there is no, then the method fails to find the requested information and the equipment optionally transmits the result of the searching failure via the output module 1215 (step 924). Otherwise, the application processing module 1211 checks (step 904) triplet information of the element, including the target cell and the source cell information of the element of the segment in the group, in which the element herein can be the segment head or the segment member. Then the application module 1211 checks (step 906) whether the element expires by comparing the time when the information in the information part of the element is recorded with the request time. If the segment element does not expire, then the application processing module 1211 further matches (step 908) the requested event information with the information in the information part of the element, if the information of the element matches the request, then the requested event information is obtained and the equipment transmits the searched event information through the output module 1215 (step 915). If the element does not match the request, then the method further determines (step 909) whether the element is the last element. If it is not the last element, the next element is found (step 910) by the application module 1211 via the next pointer of the current element or the next segment pointer of the current element, depending on the current element is a member or a head as well as the next element is a member or a head of the group, and then the method loops back to step of 904, at which the application module 1211 checks the triplet information of the next element. If the element is the last element determined at step 909, then the method further determines (step 912) whether the segment which includes the last element is the last segment. If it is the last segment, then the method fails to find (step 925) the requested event information and the equipment optionally sends the result of the searching failure via the output module 1215. Otherwise, the application module 1211 finds (step 914) the next segment via the next segment pointer of the current segment head, and then checks the triplet as shown at step 904.

Alternatively, if the segment head expires (step 906), the application module 1211 unlinks the element from the event information sequence as shown at step 907, while the storage unit used to store the element can be reused to for example re-write the other event information sequence.

In comparison with the conventional technology for handling the UE-related event information, the method for managing the event information herein disclosed, in conjunction with FIGS. 1, 2, 3 and 4, enables a great deal of event history data on various UEs to be an event information sequence in which each elements involving the event data for an event is arranged in order of time and linked each other via pointers. Such event information sequence contributes to the UE-related information is managed in a separate device independent upon the UE and other existing equipment which has been involved in the application scenario, such as handover.

Further, the storage unit used to store such event information sequence can be dynamically managed in an efficient way based on that the segment head and segment member can be stored in different areas of the storage device as shown in FIG. 4. It can be understood that the structure of each element in the event information sequence linking each other is the basis of managing the storage device in such way.

As above discussed, although such lot of UE-related information is recorded, however, the information for a certain UE is still created together as a group for said certain UE so as to facilitate quick search.

The event information can be easily handled such as searching based on the event information being stored for each User Equipment as the database in the storage of the equipment in the manner as above discussed.

It should be understood that in the embodiment above described, the method of managing event information for various events of User Equipments in a control node in a mobile communication system, and the method of searching for the requested information for various event has been described in specific embodiments, but it is used only for an example, not for limiting.

What is claimed is:

1. A method for handling a request for obtaining event information relating to a User Equipment (UE) of a plurality of UEs from an event information sequence for the plurality of UEs, the event information sequence obtained by creating a plurality of segments for the plurality of UEs upon recording of event information for the plurality of UEs, in which segments pertaining to respective UEs are linked as a group and in which each segment including one or more elements, wherein each element includes a next pointer pointing to a next element in the event information sequence and a state to show whether the element is released, and wherein at least one element of each segment is a segment head that includes a next segment pointer pointing to a next segment in a same group, a previous pointer pointing to a previous element in the event information sequence, and an identity of the segment, and storing the elements in order of time when the event information sequence is recorded for the plurality of UEs, the method including:
    obtaining the group of segments which is created for the UE from the event information sequence based on an identity of the UE included in the request;
    comparing at least one matching parameter included in the request with event information of each element of segments in the group for the UE till the requested event information is obtained or all elements if the group is compared, wherein a next element to be compared is found via at least one of a next pointer and a next segment pointer of the current element; and
    obtaining respective event information when said at least one matching parameter is matched.

2. The method according to claim 1, wherein one or more element of each segment, except said at least one element being the segment head, is a segment member.

3. The method according to claim 2, wherein storing the elements in order of time including:
    storing all of the segment heads in a segment head allocated area of a storage with consecutive storage units;
    storing all of the segment members in a segment member allocated area of said storage; and
    setting an unallocated area between the segment head allocated area and the segment member allocated area in the storage.

4. The method according to claim 1, wherein the next element to be compared is found via the next pointer when the next element to be compared is a segment member in the group, and the next element to be compared is found via the next segment pointer when the next element to be compared is a segment head.

5. The method according to claim 1, wherein obtaining the group of segments for the UE includes:
    getting a UE context based on the identity of the UE, wherein the UE context includes a head pointer which points to a first segment of the group for the UE and a tail pointer which points to the last segment of the group; and
    obtaining the group of segments for the UE based on the head pointer and tail pointer.

6. An equipment used for handling event information relating to User Equipment, comprising:
    a storage device, used to store an event information sequence for a plurality of User Equipment (UEs), including event information for a UE of the plurality of UEs, which event information sequence is obtained by creating a plurality of segments for the plurality of UEs upon recording of event information for the plurality of UEs, in which segments pertaining to respective UEs are linked as a group and in which each segment including one or more elements, wherein each element includes a next pointer pointing to a next element in the event information sequence and a state to show whether the element is released, and wherein at least one element of each segment is a segment head that includes a next segment pointer pointing to a next segment in a same group, one or more previous pointers pointing to a previous element in the event information sequence, and an identity of the segment, and arranging the elements in order of time when the event information sequence is recorded for the plurality of UEs, in which the storage device is divided into a head allocated area, a member allocated area, and an unallocated area, in which the head allocated area is used to store each segment head which is provided with the next pointer, the previous pointer, the next segment pointer, the state and the identity, and the member allocated arena is used to store each element that is not a segment head as a segment member;
    an input module, used to receive a request for obtaining event information from the storage device; and
    an output module, used to output a result responding to the request.

7. The equipment according to claim 6, wherein at least one of an idle storage unit of the head allocated area and the member allocated area is merged with its adjacent storage unit when the latter is idle or unallocated to store the element to form an idle area, and the idle storage unit or the idle area is merged with the unallocated area when the idle storage unit or the idle area is adjacent to the unallocated area, respectively, at least one of the idle storage unit of the head allocated area and the member allocated area referring to the unit in which the state of the stored element shows the element is released.

8. The equipment according to claim 6, further including an application processing module used for:
- obtaining, upon the request which is received via the input module for obtaining event information, a group of segments which are created for a UE and stored in the storage device based on an identity of the UE included in the request;
- comparing at least one matching parameter included in the request with event information of the segments in the obtained group; and
- outputting the event information via the output module if said at least one matching parameters are matched.

9. The equipment according to claim 8, wherein the application processing module is further used to compare the at least one matching parameter with the event information of each element of segments in the group till the requested event information is obtained or all elements of the group is compared, wherein a next element to be compared is found via at least one of a next pointer and a next segment pointer of the current element.

\* \* \* \* \*